United States Patent [19]
Kasugai et al.

[11] 3,936,304
[45] Feb. 3, 1976

[54] ARTICLE HAVING A WHITENED POLYOLEFIN SURFACE

[75] Inventors: Tsuneo Kasugai; Nobuhiko Minagawa, both of Fujinomiya; Yasushi Hamada; Yujiro Sugahara, both of Tokyo; Hiroyuki Naito, Tsuruoka, all of Japan

[73] Assignee: Fuji Photo Film Co., Ltd., Japan

[22] Filed: Oct. 12, 1973

[21] Appl. No.: 405,986

Related U.S. Application Data

[63] Continuation-in-part of Ser. No. 213,531, Dec. 29, 1971, abandoned.

[30] Foreign Application Priority Data

Dec. 29, 1970 Japan.............................. 45-121449

[52] U.S. Cl.......................... 96/82; 96/85; 96/82; 423/69; 423/305; 423/311; 106/299
[51] Int. Cl................................................ D21h 1/28
[58] Field of Search ........ 117/33.5 T, 152, 155 UA; 423/305, 69, 311; 96/85, 84 R, 87 R; 106/299

[56] References Cited
UNITED STATES PATENTS

| | | | |
|---|---|---|---|
| 2,819,183 | 1/1958 | Alles................................. | 117/33.5 |
| 3,255,130 | 6/1966 | Keim et al. ............................. | 260/8 |
| 3,396,143 | 8/1968 | Newland et al...................... | 260/41 |
| 3,444,115 | 5/1969 | Needham et al...................... | 260/23 |
| 3,471,252 | 10/1969 | Sugahara et al. ................... | 423/305 |
| 3,556,720 | 1/1971 | Cox et al. ........................... | 423/305 |
| 3,558,273 | 1/1971 | Beck.................................. | 423/305 |

*Primary Examiner*—Michael R. Lusignan
*Attorney, Agent, or Firm*—Richard C. Sughrue

[57] ABSTRACT

When titanium phosphate is used as a white pigment to an article of which surface comprises polyolefin composition, the article is remarkably whitened.

4 Claims, 1 Drawing Figure

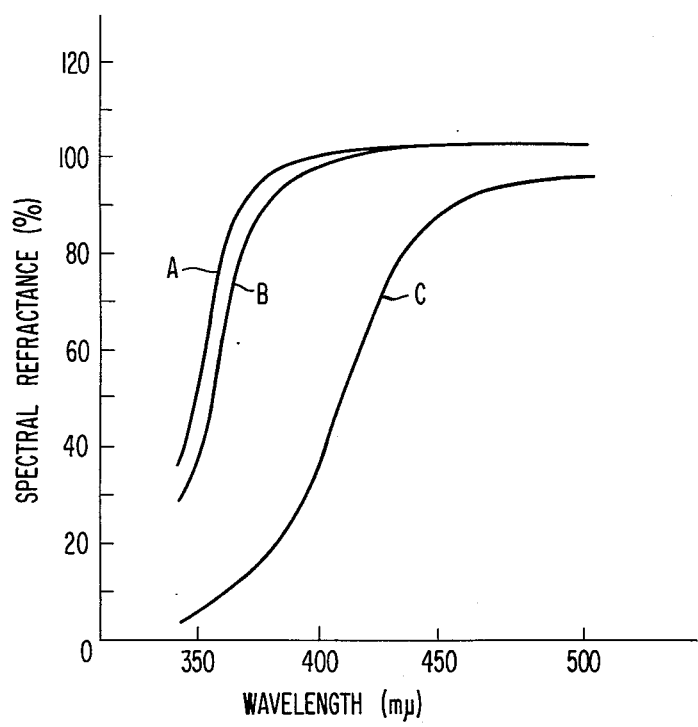

ARTICLE HAVING A WHITENED POLYOLEFIN SURFACE

CROSS REFERENCE TO RELATED APPLICATIONS

This is a continuation-in-part application of copending application, Ser. No. 213,531 filed Dec. 29, 1971, now abandoned.

BACKGROUND OF THE INVENTION

1. Field of the Invention

This invention relates to an article having a whitened polyolefin surface, and in particular to a remarkably whitened surface of an article wherein the surface is a novel polyolefin composition.

2. Description of the Prior Art

Articles having a polyolefin surface include fibrous articles, films, molded articles and articles prepared by providing materials other than a polyolefin, such as other synthetic resins, metals, paper, ceramic products, woods, etc., with a polyolefin as a coating layer or laminate. These articles are used in many fields. For example, laminates with a synthetic resin or metal are used in utensils, household articles, e.g., a furniture, or a poster, laminates with paper are used as supports for photographic materials, various printing papers, covers for books, etc.

In certain special uses the polyolefin surface required to be white, especially in uses such as a material for a photographic support, a printing paper or a poster, and the polyolefin surface layer whitened by adding thereto a white pigment.

A very special case is that of light-sensitive materials comprising a light-sensitive emulsion layer on a support. Upon exposure to light, light is reflected by the support and the reflected light influences the exposed emulsion layer and causes deterioration in the sharpness of final photographic image. To diminish the light-reflection, various means have been used. Usually, in the case of photographic paper, the support is filled with a white pigment and made opaque. For example, photographic baryta paper has a $BaSO_4$-rich surface layer, and polymer films for photographic use contain white pigments such as titanium dioxide, zinc oxide, basic lead carbonate, antimony oxide, zinc sulfide, calcium sulfate, etc.

However, among these white pigments, only titanium oxide and zinc sulfide have a high refractive index to the light, and hence the polyolefin surface wherein other white pigments are used has the defect that it does not become sufficiently opaque. White zinc sulfate is excellent in its action of making the surface opaque, when applied to, for example, a photographic light-sensitive material, it has the serious defect that it causes fog on the photographic light-sensitive emulsion, and hence it cannot be applied to a light-sensitive material. Since titanium dioxide itself is not pure white, a polyolefin surface to which titanium dioxide is added has a yellowish tint and hence a polyolefin surface containing titanium dioxide has the defect that sufficient whitening effect by a fluorescent agent cannot be obtained due to the small reflectance to ultraviolet rays of wave lengths shorter than 400 m$\mu$. Therefore, it is difficult to make the surface pure-white using titanium dioxide.

SUMMARY OF THE INVENTION

The inventors have investigated the problems of the prior art to improve the whiteness of the polyolefin-coated surface of such articles as are described above and, as a result, have found that those problems can be avoided by adding titanium phosphate to a polyolefin composition constituting the surface of an articles as a white pigment, whereby a remarkable whitening as compared to conventional white pigments can be obtained.

The present invention thus relates to an article having a whitened polyolefin surface which is characterized in that titanium phosphate is used as the whitening pigment.

The object of the present invention is to provide an article having a whitened polyolefin surface.

Another object of the present invention is to provide a mark or a signal with pure white background.

BRIEF DESCRIPTION OF THE ACCOMPANYING DRAWING

FIGURE shows the curves as determined relative to % spectral reflection vs. wavelength (m$\mu$). Curve $a$ and curve $b$ show the ultraviolet reflection spectra when the molar ratio of $TiO_2:P_2O_5$ are 3:1 and 7:1, respectively and curve $c$ shows the ultraviolet reflection spectrum of rutile-type titanium dioxide.

DETAILED DESCRIPTION OF THE INVENTION

Titanium phosphate is an eutectic crystal of titanium dioxide ($TiO_2$) and phosphorous pentaoxide ($P_2O_5$) represented by the general formula:

$$mTiO_2 \cdot nP_2O_5$$

Processes for producing this material are described in detail in U.S. Pat. No. 3,471,252, Japanese Pat. Publication Nos. 26,618/70 and 26,619/70, which can summarized as follows.

An organic or inorganic salt of titanium is prepared by treating a raw ore containing titanium dioxide, such as ilmenite, iron sand slag, rutile ore, high titanium slag, etc. with an inorganic acid such as sulfuric acid, nitric acid, etc., or an organic acid such as oxalic acid, formic acid. Aqueous solutions thereof can of course be used. The resulting organic or inorganic salt of titanium is reacted with an oxy acid of phosphorus to obtain the titanium phosphate. Orthophosphoric acid ($H_3PO_4$), metaphosphoric acid ($HPO_3$), pyrophosphoric acid (), etc. can be used as the oxy acid of phosphorus. According to the usual processes, the value of $m/n$ is from 1/1 to 7/1, but, when an increased amount of the $TiO_2$ ingredient is especially required, denatured titanium phosphate having an $m/n$ value more than 7, and whose reflectance to ultraviolet of a wavelength lying between 360 and 400 m$\mu$ is more than 30%, can be prepared by the process described in Japanese Patent Publication No. 26,618 and U.S. Pat. No. 3,471,252, that is, by extracting the $P_2O_5$ ingredient from the titanium phosphate of a 1/1 to 7/1 m/n value. This denatured titanium phosphate can be used in the present invention. Titanium phosphate of $m/n$ value higher than 2.0 was used as the white pigment in this invention.

In the extrusion of polyolefin filled with titanium phosphate, small $m/n$ value of titanium phosphate causes a serious defects of voids in extrudates and discoloration of extrudates.

In this invention, we found that the smaller the *m/n* value was, the lower the possible extrusion temperature was, and when the titanium phosphate of *m/n* value smaller than 2.0 was used at high extrusion temperature, the extrudates looked like lace or net and color of them were not white but gray or brown.

Hence we concluded that titanium phosphate of *m/n* value smaller than 2.0 could not be used as the white pigment for polyolefin extrudates.

In addition to the independent use of titanium phosphate, a mixture of titanium phosphate and other white pigments such as titanium dioxide, barium sulfate, etc., or a pigment dust prepared by covering the surface of particles of other white pigments with titanium phosphate can also preferably be used in the present invention.

The spectra showing the reflection of titanium phosphate and rutile-type titanium oxide to the ultraviolet light measured by a 139-type spectrophotometer made by Hitachi, Ltd. are given in the drawing wherein curve *a* and curve *b* show the ultraviolet reflection spectra when the molar ratio of $TiO_2:P_2O_5$ are 3:1 and 7:1, respectively and curve *c* shows the ultraviolet reflection spectrum of rutile-type titanium oxide.

As shown in FIGURE, titanium phosphate has large value of reflectivity for ultraviolet rays of wavelengths shorter than 400 m$\mu$ as compared to titanium dioxide. Titanium phosphate having this characteristic is used in the present invention.

The amount of titanium phosphate, added based on polyolefin can be selected to be in the range of less than 70%, but, there exist preferred, range according to the use of the article. For example, when used as a support for a water proof photographic paper, the desirable range thereof is 5 to 40%. That is, 5 to 40 parts by weight of titanium phosphate is kneaded with 100 parts by weight of polyolefin.

The term polyolefin as is used in the present specification means polyethylene, polypropylene, or copolymer having these polymers as major components, (more than 50 mole%, for example, ethylene-vinyl acetate copolymer and ethylene-ethylacrylate copolymer) and mixtures thereof.

The term article includes all variously shaped articles such as thread-formed, string-formed or belt-formed articles, molded articles (block), etc. made of polyolefin and to combinations of polyolefins and other materials such as other synthetic resins, metals, papers, ceramic products, wood, etc., having a polyolefin-coated surface. In this point since the present invention aims at whitening any polyolefin surface, it is quite natural that all articles having a polyolefin surface are intended.

In the prior art, polyolefin surface has, in some cases, been whitened by the combined use of a white pigment and a fluorescent brightening agent. The application of titanium phosphate by the present invention brings about similarly preferred results in combined use of titanium phosphate and a fluorescent brightening agent. In fact, as is shown in the examples, the whitening effect thereof is far superior to that in the case of titanium oxide. Examples of the fluorescent brightening agent are Kayalight-O (made by Nippon Kayaku K.K.) whitefluor PEN, -PHR (made by Sumitomo Chemical Co., Ltd.) Blankophore-KU, -KL (made by Farbenfabriken Bayer), etc.

Others are as follows:

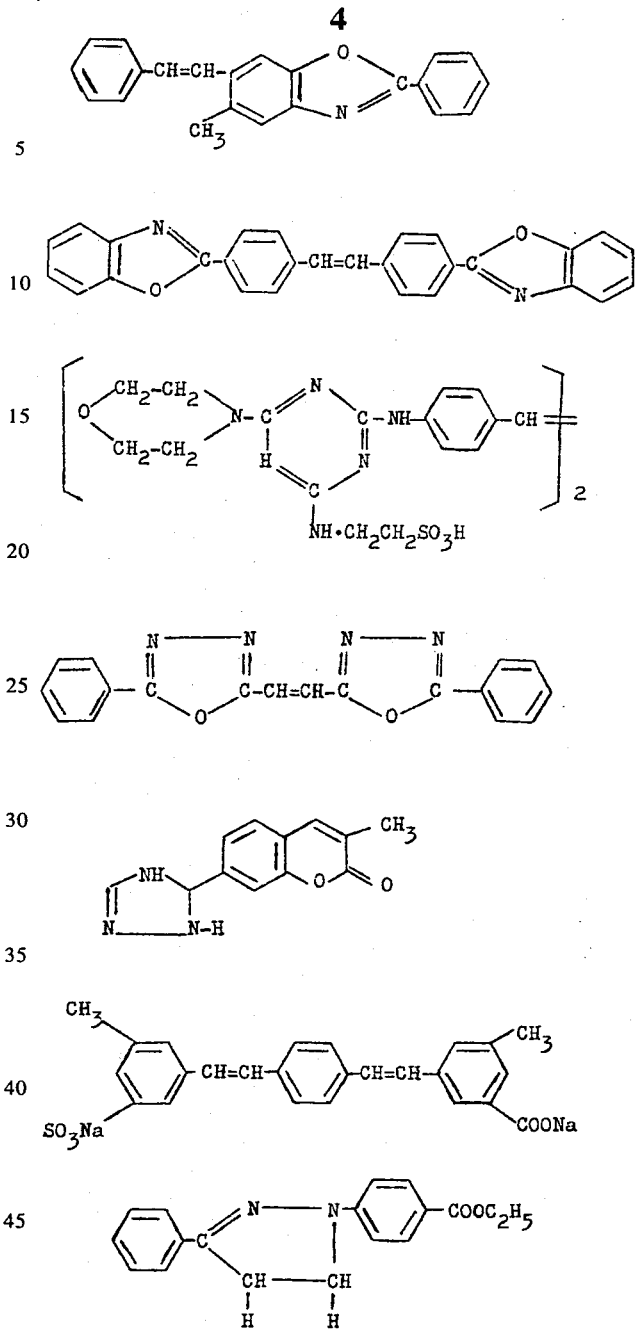

Titanium phosphate used in accordance with the present invention exhibits a remarkable effect, especially when applied to a support for photographic light-sensitive material. In this case, in addition to the whitening effect, photographically harmful influences casued by titanium phosphate, such as fog, etc., are not observed at all, and hence titanium phosphate is excellent as a material for a water proof photographic paper.

The present invention is further explained below by several examples. In the Examples, the whiteness of the polyolefin surface was measured as follows. The polyolefin surface was irradiated with white light from a wolfram lamp using a 139-type spectrophotometer made by Hitachi, Ltd. The whiteness was determined by the reflection intensity of the reflected light of wavelengths of 380 and 440 m$\mu$. The reflection intensity of a standard reflection plate (MgO) was calculated as 100.

EXAMPLE 1

Polyolefin films A and B having the following composition (240 microns in thickness) were prepared according to the flat-die process.

| Composition of polyolefin film A (within the invention) | |
|---|---|
| Polyethylene (0.96 g/cm$^3$ in density) | 10 Kg |
| Titanium phosphate (TiO$_2$:P$_2$O$_5$=3:1) | 1.5 Kg |
| Composition of the polyethylene film B (comparison) | |
| Polyethylene (the same as above) | 10 Kg |
| Titanium oxide (rutile-type) | 1.5 Kg |

The whiteness of the films A and B thus obtained was measured to obtain the following results.

| | Whiteness | |
|---|---|---|
| | 380 m$\mu$ | 440 m$\mu$ |
| Film A | 77 | 95 |
| Film B | 17 | 79 |

From these results, it was confirmed that the whiteness of film A prepared by the combination of polyethylene and titanium phosphate was greater than that of the film B prepared by the conventional combination of polyethylene and titanium oxide.

Both of these films were used as a base for a poster and a photographic paper. In the case of both the poster and the photographic paper, the above described difference in whiteness remained as such. Thus, it was confirmed that the film by the present invention was excellent in these applied fields.

EXAMPLE 2

Polyethylene compounds of following compositions were extruded through the die and coated on the surface of paper.

The density and melt index of raw polyethylene was 0.916 g/cm$^3$ and 7.0, respectively, and the thickness of coated layers were 30 microns.

| Composition No. | Polyethylene | Titanium Phosphate | |
|---|---|---|---|
| | Kg | Kg | |
| C | 10 | 1.5 | (TiO$_2$/P$_2$O$_5$=1:1) |
| D | 10 | 1.5 | (TiO$_2$/P$_2$O$_5$=1.6:1) |
| E | 10 | 1.5 | (TiO$_2$/P$_2$O$_5$=2:1) |
| F | 10 | 1.5 | (TiO$_2$/P$_2$O$_5$=3:1) |
| G | 10 | 1.5 | (TiO$_2$/P$_2$O$_5$=4.5:1) |

The highest extrusion temperatures of these polyethylene compounds without voids and whiteness of coated paper were as follows.

| Composition No. | Possible Highest Extrusion Temperature |
|---|---|
| C | 180°C |
| D | 220°C |
| E | 300°C |
| F | higher than 320°C |
| G | higher than 320°C |

| Composition No. | Extrusion Temperature | Whiteness | |
|---|---|---|---|
| | | 380 m$\mu$ | 440 m$\mu$ |
| C | 180°C | 11 | 42 |
| D | 220°C | 15 | 66 |
| E | 300°C | 92 | 101 |
| F | 320°C | 75 | 94 |
| G | 320°C | 80 | 99 |

From these results it is apparent that titanium phosphates of m/n (TiO$_2$/P$_2$O$_5$) values of 1.0 and 1.6 could not be used as the white pigments, while those of m/n values higher than 2.0 are excellent as the white pigments for polyethylene extrudate.

EXAMPLE 3

Polyethylene films H and I (240 microns in thickness) were prepared in the same manner as in Example 1.

| Composition of polyethylene film H (within the invention) | |
|---|---|
| Polyethylene (0.96 g/cm$^3$ in density) | 10 Kg |
| Titanium phosphate (TiO$_2$:P$_2$O$_5$=3:1) | 1.5 Kg |
| Whitefluor (a fluorescent brightening agent made by Sumitomo Chemical Co., Ltd.) | 0.015 Kg |
| Composition of polyethylene film I (comparison) | |
| Polyethylene (the same as the above described polyethylene) | 10 Kg |
| Titanium oxide (rutile-type) | 1.5 Kg |
| Whitefluor | 0.015 Kg |

The whiteness of films H and I was measured as in Example 1 to obtain the following results.

| | Whiteness | |
|---|---|---|
| | 380 m$\mu$ | 440 m$\mu$ |
| Film H | 98 | 110 |
| Film I | 28 | 88 |

As is apparent from these results, when the polyolefin surface was whitened with a fluorescent brightening agent, the effect of the titanium phosphate was remarkably greater than that of titanium oxide.

EXAMPLE 4

Polyethylene tubes of 15 mm in diameter were extruded by following compositions to prepare white tube J and K.

The thickness of tube was 1.5 mm and the extrusion temperature was 200°C.

| Composition of the polyethylene compound for tube J. | |
|---|---|
| Polyethylene (0.92 g/cm$^3$ in density) | 10 Kg |
| Titanium Phosphate (TiO$_2$:P$_2$O$_5$=4.5:1) | 1 Kg |
| Kayalight-O (a fluorescent brightening agent made by Nippon Kayaku K.K.) | 0.015 Kg |
| Composition of the polyethylene compound for tube K | |
| Polyethylene (0.92 g/cm$^3$ in density) | 10 Kg |
| Titanium dioxide (rutile-type) | 1 Kg |
| Kayalight-O (the same as described above) | 0.015 Kg |

The whiteness of the tube J and tube K thus obtained was measured immediately after the production and after exposing them to sunlight for 1 year outdoors and the results obtained were as follows.

| | Whiteness immadiately after the production | | Whiteness after 1 year exposing | |
|---|---|---|---|---|
| | 380 m$\mu$ | 440 m$\mu$ | 380 m$\mu$ | 440 m$\mu$ |
| Tube J | 97 | 108 | 96 | 103 |
| Tube K | 28 | 85 | 17 | 78 |

As is apparent from these results, the tube J is higher than the tube K in whiteness and the decrease of whiteness by sunlight exposure is smaller than that of the tube J.

EXAMPLE 5

A photographic base paper of 180 g/m² weight was backed with polyethylene of 0.92 g/cm³ in density. The other surface of the resulting photographic base paper backed with polyethylene was coated with polyethylene to prepare a support L for use as water proof photographic paper. The polyethylene layers on both sides of the paper were 30 microns in thickness, and the coating was by an extrusion coating process.

| Composition of the polyethylene coated on the surface of the support L for a water proof photographic paper | |
|---|---|
| Polyethylene (0.92 g/cm³ in density) | 10 Kg |
| Barium sulfate | 0.2 Kg |
| Titanium phosphate ($TiO_2:P_2O_5$=20:1) | 0.8 Kg |
| Kayalight-O (a fluorescent brightening agent made by Nippon Kayaku K.K.) | 0.015 Kg |

The whiteness of the surface of a water proof photographic paper obtained by coating a silver halide photographic emulsion onto the surface of the support L was 97 (at 380 m$\mu$) and 110 (at 440 m$\mu$), which is sufficient for use as a photographic material.

EXAMPLE 6

Denatured titanium phosphate deposited on the surface of dust particles of titanium oxide was prepared as follows.

A slurry suspension consisting of 800 g of rutile-type titanium oxide and 3,200 g of water was kept at 30°C. Then, 64 g of titanium sulfate aqueous solution containing 30% by weight of titanium sulfate was added thereto, and the suspension stirred well. Thereafter, 56 g of an aqueous solution containing 10% by weight of orthophosphoric acid was gradually added thereto. The pH of the resulting suspension was then adjusted to 8.0 by adding sodium hydroxide, and the liquid phase filtered off. The solid phase produced was washed with water to remove soluble salts, dried, and calcined in a furnace at 500°C. The resulting pigment mass was crushed in a ball mill to obtain denatured titanium phosphate.

The weight ratio of titanium phosphate to titanium oxide in the denatured titanium phosphate obtained in this example was 10/100.

A water proof paper M was prepared by coating the surface of a printing paper of high quality (100 g/m² in weight) with polyethylene having the following composition.

| Composition of the layer coated on the surface of the water proof paper M | |
|---|---|
| Polyethylene (0.92 g/cm³ in density) | 10 Kg |
| Denatured titanium phosphate as prepared above | 1 Kg |
| Kayalight-O | 0.015 Kg |

The whiteness of the surface of the water proof paper M was measured. The results were as follows.

| | Whiteness | |
|---|---|---|
| | 380 m$\mu$ | 440 m$\mu$ |
| Water proof paper M | 96 | 108 |
| Water proof paper N (for comparison) | 28 | 88 |

As is obvious from the above results, in the embodiment where titanium phosphate exists as a shell around titanium oxide dust particles, the whiteness thereof was more excellent than that for the combined use of polyethylene and titanium oxide (water proof paper N).

EXAMPLE 7

Denatured titanium phosphate was deposited on the surface of zinc oxide particles as in the Example 6, and a water proof paper O similar to that in Example 6 was produced using the resulting denatured titanium phosphate.

| Composition of the layercoated on the surface of the water proof paper O | |
|---|---|
| Polyethylene (0.92 g/cm³ in density) | 10 Kg |
| Denatured titanium phosphate | 1 Kg |
| Kayalight-O | 0.015 Kg |

The whiteness of the surface of the water proof paper O was measured to obtain the following results.

| | Whiteness | |
|---|---|---|
| | 380 m$\mu$ | 440 m$\mu$ |
| Water proof paper O | 98 | 112 |
| Water proof paper N (for comparison) | 28 | 88 |

From the above results, the same conclusions as in the Example 6 were drawn.

EXAMPLE 8

Crystalline polypropylene films P and Q of 240 microns thickness having the following composition were prepared.

| Composition of polypropylene film P (within the invention) | |
|---|---|
| Crystalline polypropylene | 10 Kg |
| Titanium phosphate ($TiO_2:P_2O_5$=3:1) | 1.5 Kg |
| Whitefluor | 0.015 Kg |
| Composition of polypropylene film Q | |
| Crystalline polypropylene | 10 Kg |
| Titanium oxide (rutile-type) | 1.5 Kg |
| Whitefluor | 0.015 Kg |

The whiteness of the polypropylene films P and Q immediately after the production thereof and after exposure to sunlight for 1 year was measured. The results were as follows.

| | Whiteness immediately after the production | | Whiteness after exposure to sunlight for 1 year | |
|---|---|---|---|---|
| | 380 m$\mu$ | 440 m$\mu$ | 380 m$\mu$ | 440 m$\mu$ |
| Polypropylene film P | 98 | 110 | 92 | 100 |
| Polypropylene film Q | 27 | 85 | 16 | 75 |

From this example, it is apparent that polypropylene film P containing titanium phosphate is excellent in its whiteness and weather-durability. In addition, it is clear that polypropylene as well as polyethylene produce the same preferred results.

EXAMPLE 9

Injection molding was conducted according to a conventional method using the polyolefin-titanium phosphate compositions described in the above Examples to produce molded articles, whose surface had the whiteness described in the aforesaid corresponding example. By this example, it was shown that the present invention provides the same results when the polyolefin-titanium phosphate composition is molded and processed into any form of articles.

What is claimed is:

1. An article comprising a substrate coated with a layer of a polyolefin composition containing particulate titanium phosphate as a white pigment, the titanium phosphate ($m\text{TiO}_2 \cdot n\text{P}_2\text{O}_5$) having an $m/n$ ratio larger than 2.0, said polyolefin composition reflecting large proportions of ultraviolet rays of wavelengths shorter than 400 m/$\mu$ as compared to titanium dioxide.

2. The article of claim 1 further comprising a light-sensitive photographic emulsion layer coated on said layer of said polyolefin composition.

3. The article of claim 2 wherein said layer of said polyolefin composition further comprises a fluorescent brightening agent.

4. The article of claim 2 wherein from 5 to 40 parts of said titanium phosphate are present per 100 parts by weight of polyolefin.

* * * * *